United States Patent
Chambolle et al.

[15] 3,641,816
[45] Feb. 15, 1972

[54] METHOD AND DEVICE FOR METERING A VECTOR PARTICULARLY APPLICABLE TO THE METERING OF A FLUID FLOW VELOCITY

[72] Inventors: Stephane Chambolle, Paris; Michel Max Hanff, Brest, both of France

[73] Assignee: Compagnie Des Compteurs, Paris, France

[22] Filed: Feb. 11, 1970

[21] Appl. No.: 10,422

[30] Foreign Application Priority Data

Feb. 18, 1969 France..................................6903999

[52] U.S. Cl..........................................73/189, 235/151.34
[51] Int. Cl............................................G01w 1/00
[58] Field of Search.................73/189, 198, 194 EM, 170 A; 235/186, 189, 151.3, 151.31, 151.34

[56] References Cited

UNITED STATES PATENTS 3,161,047  12/1964  Griswold..................................73/189
3,435,677  4/1969  Gardner..................................73/189

Primary Examiner—Richard C. Queisser
Assistant Examiner—John P. Beauchamp
Attorney—Pierce, Scheffler and Parker

[57] ABSTRACT

Method and device for metering a vector particularly applicable to the metering of a fluid velocity in which the method comprises the use of a first apparatus giving the components of the vector according to two perpendicular directions, a second apparatus giving the components of a known field according to said directions and electric means to process the components coming from said first and second apparatus and give at the output thereof an information of the vector in relation to the known field.

20 Claims, 4 Drawing Figures

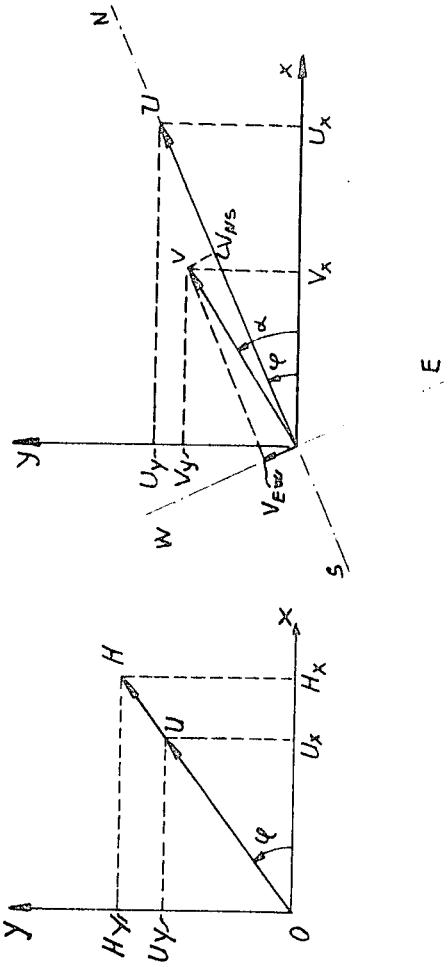

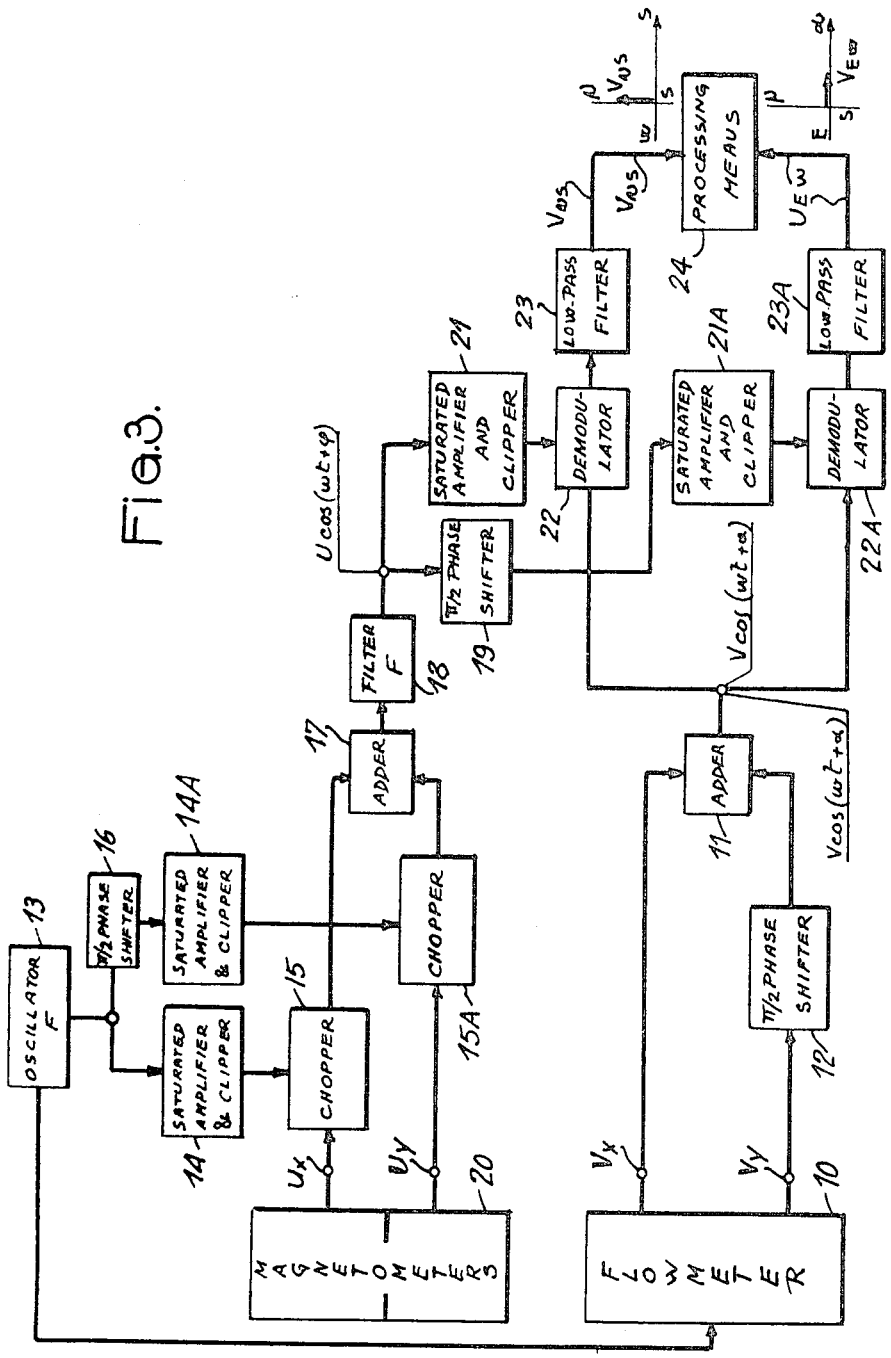

METHOD AND DEVICE FOR METERING A VECTOR PARTICULARLY APPLICABLE TO THE METERING OF A FLUID FLOW VELOCITY

The present invention relates to a metering method, in magnitudes and direction, of a vector, particularly applicable to the metering of fluid flow velocity by means of an electromagnetic flow-meter, as well as devices for operating this method.

More precisely, the invention relates to a method enabling the components of a velocity vector established according to any two perpendicular directions, to be converted into two other components according to two perpendicular reference directions, of which one is preferably the magnetic North and moreover, to ascertain the argument of the velocity vector in relation to a reference direction, also preferably the magnetic North.

Among the problems encountered in oceanography one, in particular, is that posed of detecting marine and submarine currents, and, in a more precise manner, the ascertaining of their orientation and speed at a given point. For instance, buoys are utilized, immersed at certain points. These buoys transmit the data of various sensors that they contain (temperature, salinity, etc.) either to a local recorder, or to a processing center where they are interrogated by means of receiver-transmitters carried by floats and connected by cable to each of the buoys.

Apparatuses are already known, called "mechanical flow-meters" enabling the velocity of a fluid flow to be metered, these devices are generally based on hydrodynamic principles and have for their main defect of being unstable in the flow to be metered, and hence, to give not very accurate informations. Actually, the use of a rotor driven by the fluid flow has certain limitations: the speed must be greater than a minimum speed below which the relation is no longer linear on account of the inertia of the rotor; furthermore, the rotor is easily slowed down or blocked by marine detritus hence the data are wrong; lastly, the apparatus only gives a mean speed measurement on a time lag requiring from 30 sec. to 1 minute.

Flow-meters are also known based on the electromagnetic principle, in which the speed of a conducting fluid flow is obtained by measuring the voltage induced by its own movement in an auxiliary alternating magnetic field to which it is subjected. By utilizing two pairs of electrodes in two perpendicular directions, one obtains the components of the velocity vector representative of the fluid flow to be measured according to said two directions.

However, these known devices, although hydrodynamically stable, have the disadvantage of only giving the direction of the flow with respect to their own orientation, or in other words, they do not give the direction of the flow in relation to a reference direction which is independent and perfectly determined.

The invention essentially has the object of obviating this latter disadvantage by associating a flow-meter of the electromagnetic type with a horizontal magnetic compass, this association enabling to obtain, in relation to the magnetic north indicated by the compass in the considered point and taken as reference direction:

either the north-south and east-west components of the velocity vector of the fluid flow to be metered, or the argument of this vector and its modulus.

In addition to this result, the invention also proposes to obtain other advantages, namely: the possibility of precise and instantaneous meterings, and especially the possibility of easily obtaining, by simply integrating the components of the velocity vector, the mean value of the fluid flow in quantity and direction, whereas this is scarcely achievable when the velocity vector of the flow is given in polar coordinates by its modulus and argument.

According to the invention, the method of metering a velocity vector which is defined by two alternating voltages coming from a metering apparatus, and representing the components of this vector according to two perpendicular directions, said method being particularly applicable to the metering of a fluid flow by means of an electromagnetic flow meter and is characterized in that it consists of:

associating with said metering apparatus a pair of magnetometers supplying two direct voltages proportional to the components of the terrestrial magnetic field according to these same perpendicular directions, producing a first voltage from the voltages coming from the metering apparatus by the addition of one of these voltages to the other put into phase quadrature, producing a second voltage from the two voltages coming from the magnetometers by respectively chopping these voltages by means of two rectangular voltages which are themselves in phase quadrature and at the same frequency as that of the alternating voltages coming from the metering apparatus, then by adding the voltage thus obtained and by filtering the result of this addition, and converting said second voltage into at least one rectangular voltage for controlling at least one demodulator circuit to whose input the first produced voltage is applied, the output voltage of this latter demodulator representing, after integration, a display of the velocity vector in relation to the magnetic north.

According to the representation of the velocity vector that one wishes to obtain, in Cartesian or polar coordinates, the second produced voltage is utilized either with a voltage in phase quadrature for controlling two demodulator circuits supplying north-south and east-west components of the velocity vector, or alone for controlling a demodulator circuit supplying the argument of the vector in relation magnitude of the magnetic north. The modulus of this vector is then obtained, in this latter case, by the synchronous demodulating of the first produced voltage.

The invention also covers devices for carrying out the above-mentioned method, these devices essentially comprising a speed metering apparatus supplying two alternating voltages representing the components of the flow velocity vector according to two perpendicular directions, two magnetometers having their sensitive element respectively placed according to these two perpendicular directions, a circuit for producing the first voltage connected to the output of the speed metering apparatus and comprising a $\pi/2$ dephasing circuit and a summation circuit, a circuit for producing the second voltage connected to the output of the magnetometers and comprising two chopper circuits controlled by phase quadrature rectangular voltages at the frequency of the alternating voltages, said circuit for producing the second voltage being followed by a summation and filtering circuit, a circuit for putting this second voltage into shape, and at least one demodulator circuit connected to the output of said circuit for putting this second voltage into shape and to said circuit for the first voltage, said demodulator circuit being then followed by an integrating and processing circuit.

The invention is generally applicable to oceanographic buoys immersed at certain points of the ocean and intended to meter and transmit or record various other parameters relating to the marine environment: pressure, temperature, conductivity, etc.

In order to afford a better understanding of the characteristics of the invention, one will give, by way of nonrestrictive examples, two embodiments while referring to the following description and accompanying drawings.

In these drawings,

FIGS. 1 and 2 are explanatory diagrams of the invention utilizing a diagram according to Fresnel's theory.

FIG. 3 is a diagram of the circuit of a metering device of the components of a velocity vector according to the method of the invention.

Figure 4:
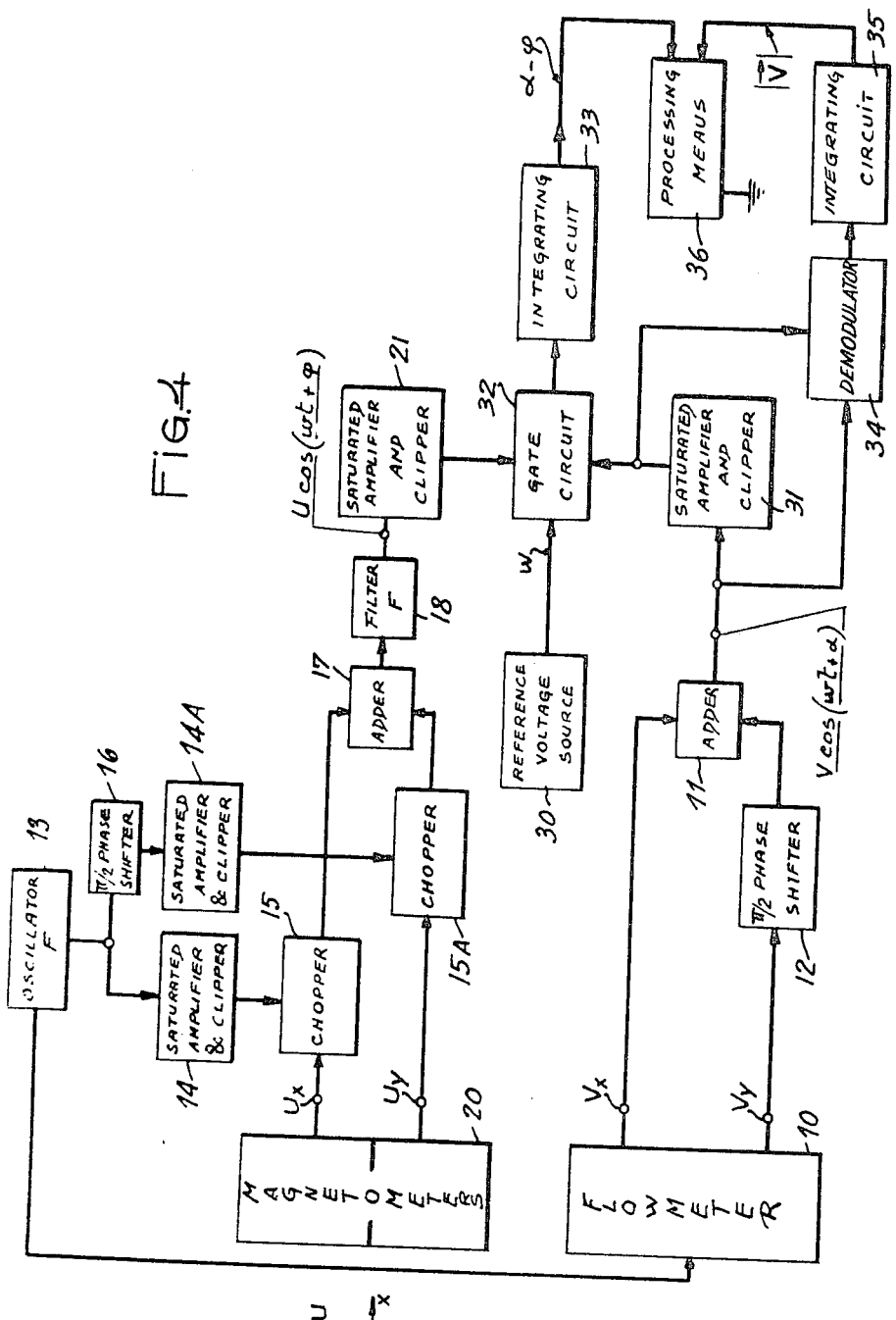
FIG. 4 shows an alternative of the diagram of FIG. 3 for measuring the argument of the modulus of the velocity vector according to the invention.

In that which follows, a given vector H is supposed to be known by its two components $H_x$, $H_y$ in a system of rectangular coordinates $Ox$, $Oy$ shown in FIG. 1. By graphic construction, it is possible to determine the angle $\phi$ varying from 0° to 360° and to have the orientation of the vector H with a single information instead of two.

If, in the plan of the Fresnel's theory, one takes the voltages $U_x \cdot \cos \omega t$ and $U_y \cdot \sin \omega t$, the values $U_x$ and $U_y$ being proportional to $H_x$ and $H_y$, the same geometrical figure as in the preceding case is then obtained. The resultant voltage $U_x \cdot \cos \omega t + U_y \cdot \sin \omega t$ is given by the vectorial sum $U$, and its phase displacement with $U_x \cdot \cos \omega t$ is precisely the angle $\phi$. Practically, for obtaining $U_x \cdot \cos \omega t$ and $U_y \cdot \sin \omega t$, it suffices to cut the two direct voltages $U_x$ and $U_y$ by an alternating rectangular voltage pulse of frequency $\omega$ the cutting of $U_y$ being advanced by a quarter of a period in relation to that of $U_x$. By addition followed by a filtering at the frequency $f=\omega/2\pi$, one obtains a voltage $U \cdot \cos(\omega t+\phi)$ representative of the vector H.

Supposing now that it is desired to transmit the angle $\phi$, the voltage $U \cdot \cos(\omega t+\phi)$ is converted into rectangular signals in phase with this voltage; by chopping an auxiliary voltage by means of a gate opened by the fronts of these signals and closed by the fronts of the rectangular signals in phase with the voltage $U_x \cdot \cos \omega t$, one obtains, at the output, pulses whose duration is proportional to the phase displacement $\phi$. It thus suffices to integrate the output signals for then obtaining a mean voltage proportional to this displacement.

In the device according to the invention, applied in the case of an electromagnetic flow-meter, said flow-meter is provided with two pairs of electrodes placed according to two perpendicular directions $x$ and $y$; the voltages induced by the conductor fluid flow in an auxiliary alternating magnetic field, at the frequency for instance of 20 c./sec., are collected on these two pairs of electrodes, and, after amplification and detection of the phase, supply two alternating voltages $V_x$ and $V_y$ representing the components of the velocity vector $V$ of the fluid flow to be metered according to said two directions.

The flow-meter is for instance of the type described in U.S. Pat. No. 3,161,047. If the flow-meter is integral with a buoy, it meters the speed of the surrounding flow. If the flow-meter is used by a boat, it meters the speed of the boat like a log.

The flow-meter is made integral with a pair of magnetometers, for instance of the usual saturation type (flux-valve) of which many examples exist in literature. For instance, one may cite U.S. Pat. No. 3,460,029, filed on 18th Dec. 1964 by Mr. Germain Joseph Edmond Guillemin, who works in collaboration with the inventor of this application, as well as other U.S. Pat. Nos. 2,406,870, 2,418,553, 2,476,273, 2,472,980, 2,721,974.

The probes of the magneto-meter are placed according to the two above-mentioned directions, and preferably, held by means of a Cardan suspension so as to supply two direct voltages $U_x$ and $U_y$ representing the horizontal components of the terrestrial magnetic field according to these two directions $x$ and $y$.

FIG. 2 shows the voltages $U_x$, $U_y$, $V_x$, $V_y$, and the resultant voltages $U$ and $V$ as well as their respective angles $\phi$ and $\alpha$ with the axis $Ox$. The vector $U$ consequently shows the direction of the magnetic north, and the angle $\alpha-\phi$ is the angle with this direction of the velocity vector to be metered.

By applying the method previously explained, one prepares, from the voltages $U_x$ and $U_y$ supplied by the magnetometers, voltages $U_x \cdot \cos \omega t$ and $U_y \cdot \sin \omega t$ whose sum is $U \cdot \cos(\omega t+\phi)$, $\phi$ being the angle between the magnetic north and the magnetometer placed in the direction $Ox$.

By applying the same method for preparing from the voltages $V_x$ and $V_y$ coming from the flow-meter a voltage $V_x \cdot \cos \omega t + V_y \cdot \sin \omega t = V \cdot \cos(\omega t+\alpha)$, the resultant voltage has an orientation in the Fresnel plan which actually corresponds to the orientation of the velocity vector.

The problem which then arises is to split up the voltage $V \cdot \cos(\omega t+\alpha)$ into two voltages: the one $V_{NS} \cdot \cos(\omega t+\phi)$ in phase with $U \cdot \cos(\omega t+\phi)$, and the other, $V_{EW} \sin(\omega t+\phi)$ in advance by $\pi/2$ on the preceding one.

According to the analogy between the Fresnel plan and the actual vectors, the two voltages $V_{NS}$ and $V_{EW}$ clearly represent the two components north-south and east-west of the velocity vector $V$ of the fluid flow to be metered.

Now, it is possible to obtain the voltages $V_{NS}$ and $V_{EW}$ in quantity and sign by demodulation the voltage $V \cdot \cos(\omega t+\alpha)$ with two rectangular voltages, the one in phase with the voltage $U \cdot \cos(\omega t+\phi)$, the other in phase quadrature.

FIG. 3 shows, in an assembly circuit enabling, as from the output voltages $V_x$, $V_y$ of the flow-meter and $U_x$, $U_y$ of the magnetometers for setting up voltages $V_{NS}$ and $V_{EW}$.

The reference numerals 10 and 20 respectively designate the flow-meter and magnetometers. The adder 11 designates a summation circuit formed by network on whose common point are applied, through a resistance, the voltage $V_x$ directly and the voltage $V_y$ by means of a phase shifter 12 introducing a displacement of $\pi/2$. An oscillator 13 emitting a signal BF, at 20 c./sec., for instance, is utilized for energizing the coil producing the alternating magnetic field of the flow-meter. The output signal from oscillator 13 is applied directly to a saturated amplifier and clipper unit 14 to produce a square wave signal of the same frequency that is applied to a conventional chopper unit 15 of the electronic type utilizing field effect (FET) transistors as described, for example, in the publication "Texas Instruments Electronic Series," 1965, which serves to interrupt, i.e., chop, the direct (DC) voltage $U_x$ supplied by the magnetometers. Similarly, the same output signal from oscillator 13 is applied indirectly to another saturated amplifier and clipper unit 14A via a $\pi/2$ phase shifter 16, the phase-shifted square wave output signal from the amplifier and clipper unit 14A being applied to another chopper unit 15A, of the same type as chopper unit 15, which serves to chop the DC voltage $U_y$ supplied by the magnetometers.

Through the text, as indicated above, the amplifier circuits are circuits intended to convert sinusoidal-shaped signals into rectangular signals. They are made, as shown in the drawing, for instance, by saturated amplifiers and clippers of any type known in the technique.

The voltages $U_x$ and $U_y$ of the magnetometers are respectively applied to the input of the chopper circuits 15 and 15A whose outputs are connected to a summation or adder circuit 17 followed by a filter 18 tuned on the frequency of the oscillator 13. The filtered voltage is, in its turn, converted into two rectangular voltages in $\pi/2$ phase quadrature by a phase shifter 19 and by the amplifier circuits 21, 21A. These two rectangular voltages respectively control two demodulators 22, 22A having the same type of circuit as choppers 15, 15A to whose input is applied the voltage coming from the adder circuit 11 produced elsewhere. Low-pass filters 23, 23A, connected up to the outputs of the demodulators 22, 22A, provide the mean direct voltages $V_{NS}$ and $V_{EW}$ sought, i.e., the components of the velocity vector of the fluid flow according to the known fixed directions north-south and east-west. At the processing center, the data are classified and the components $V_{NS}$ and $V_{EW}$ are utilized for restoring the velocity vector $V$ in a suitable reading or processing means assembly 24, for instance in a computer, a cathodic tube or other device, so as to permit of its statistical study.

One sees that the first voltage to be produced $V \cdot \cos(\omega t+\alpha)$ is obtained, by simple addition, on the resistance adder circuit 11, of the voltage $V_x$ and the voltage $V_y$ phase shifted by $\pi/2$. These voltages being already alternating voltages of a pulse frequency $\omega$, their vectorial addition does not necessitate any additional processing.

With regard to the voltages $U_x$ and $U_y$ which are direct voltages, it is necessary previously to convert them into rectangular voltages by means of the circuits 15 and 15A for producing the voltage $U \cdot \cos(\omega t+\phi)$ utilized for demodulating the first voltage $V \cdot \cos(\omega t+\alpha)$ in the circuits 22, 22A.

In the case where it is required to know the velocity vector both in modulus and argument, the circuit is modified as shown in FIG. 4, where the same elements as in FIG. 3 bear the same reference numerals.

The production of the two voltages $V \cdot \cos(\omega t+\alpha)$ and $U \cdot \cos(\omega t+\phi)$ is effected in a similar manner so that with regard to their production, the circuit remains unchanged. It is at the demodulation level that the circuit is modified for operating as previously shown in the explanation of the method. The preceding voltages are converted into rectangular signals by amplifier circuits 31 and 21, and the positive fronts of these signals are utilized respectively, for opening and closing a gate-circuit 32 again, to whose input is applied a reference auxiliary voltage W by means of a reference voltage source 30. At the output of the gate-circuit 32, one thus collects variable duration pulses, proportional to the phase shifting $\alpha - \phi$ of the input voltages, which are then applied to an integrating circuit 33. Said circuit 33 thus supplies a direct voltage whose mean value is proportional to the angle $\alpha - \phi$ of the velocity vector with the magnetic north, and which is utilized in the processing members 36 similar to the device 24 of FIG. 3.

To obtain the modulus of the velocity vector, a synchronous detection is made of the voltage $V \cdot \cos(\omega t + \alpha)$ by means of rectangular signals in phase with said voltage, for instance by means of demodulator 34 and integrating circuits 35. At the output of the integrating circuit 35, one collects a mean direct voltage proportional to the modulus of the voltage V, and which is utilized in the processing means 36.

Although particularly applicable to metering fluid flow by means of an electromagnetic flow-meter, the invention is not restricted to this single example of application and its field extends to all cases where, knowing a vector defined by two components according to any two rectangular directions, one wishes to convert them into components according to two other perfectly referenced directions, or to ascertain its argument in relation to a reference direction, itself defined by these two components according to two original directions. Thus, it also applies to the metering of a fluid flow by means of acoustic flow-meters, as well as metering winds by means of a directional anemometer. Of course, it is possible also to extend the metering process in three dimensions taken two by two.

We claim:

1. A method for determining a vector with respect to a reference vectorial magnitude such as the terrestrial magnetic field comprising the steps of producing according to said vector two alternating voltages having a given frequency and respective amplitudes proportional to the components of said vector according to two variable perpendicular directions,
whereby the components of said vector to be determined are known according to two perpendicular directions,
producing according to a reference vectorial magnitude two direct voltages having respective amplitudes proportional to the components of said reference vectorial magnitude according to said two variable perpendicular directions,
whereby the components of said vector to be determined may be compared to the components of said reference vectorial magnitude,
shifting the phase of one of the two alternating voltages by 90° and adding the resulting phase shifted voltage to the other one of said two alternating voltages,
whereby a first datum voltage is produced, said first datum voltage corresponding to the vector to be determined,
electrically chopping the two direct voltages at the frequency of said two alternating voltages and in such manner that the chopping of one of said two direct voltages is shifted by 90° from the chopping of the other one of said two direct voltages, then adding the two chopped voltages and filtering the added voltage at the frequency of said two alternating voltages,
whereby a second datum voltage is produced, said second datum voltage corresponding to the reference vectorial magnitude, and
electrically demodulating said first datum voltage by a signal from said second datum voltage after said filtering at the frequency of said two alternating voltages and then low-pass filtering the voltage coming therefrom,
whereby is obtained the mean direct component, with respect to the direction of the reference vectorial magnitude, of the vector to be determined.

2. A method for determining a vector with respect to a reference vectorial magnitude such as the terrestrial magnetic field comprising the steps of producing according to said vector two alternating voltages having a given frequency and respective amplitudes proportional to the components of said vector according to two variable perpendicular directions,
whereby the components of said vector to be determined are known according to two perpendicular directions,
producing according to a reference vectorial magnitude two direct voltages have respective amplitudes proportional to the components of said reference vectorial magnitude according to said two variable perpendicular directions,
whereby the components of said vector to be determined may be compared to the components of said reference vectorial magnitude,
shifting the phase of one of the two alternating voltages by 90° and adding the resulting phase shifted voltage to the other one of said two alternating voltages,
whereby a first datum voltage is produced, said first datum voltage corresponding to the vector to be determined,
electrically chopping the two direct voltages at the frequency of said two alternating voltages and in such manner that the chopping of one of said two direct voltages is shifted by 90° from the chopping of the other one of said two direct voltages, then adding the two chopped voltages and filtering the added voltage at the frequency of said two alternating voltages,
whereby a second datum voltage is produced, said second datum voltage corresponding to the reference vectorial magnitude, and
shifting by 90° the phase of said second datum voltage after said filtering at the frequency of said two alternating voltages,
whereby obtaining a shifted voltage, and
electrically demodulating the first datum voltage with said shifted voltage,
whereby is obtained the mean direct component, with respect to a perpendicular direction to the reference voltage magnitude, of the vector to be determined.

3. A method for determining a vector with respect to a reference vectorial magnitude such as the terrestrial magnetic field comprising the steps of producing according to said vector two alternating voltages having a given frequency and respective amplitudes proportional to the components of said vector according to two variable perpendicular directions,
whereby the components of said vector to be determined are known according to two perpendicular directions,
producing according to a reference vectorial magnitude two direct voltages having respective amplitudes proportional to the components of said reference vectorial magnitude according to said two variable perpendicular directions,
whereby the components of said vector to be determined may be compared to the components of said reference vectorial magnitude,
shifting the phase of one of the two alternating voltages by 90° and adding the resulting phase shifted voltage to the other one of said two alternating voltages,
whereby a first datum voltage is produced, said first datum voltage corresponding to the vector to be determined,
electrically chopping the two direct voltages at the frequency of said two alternating voltages and in such manner that the chopping of one of said two direct voltages is shifted by 90° from the chopping of the other one of said two direct voltages, then adding the two chopped voltages and filtering the added voltage at the frequency of said two alternating voltages,
whereby a second datum voltage is produced, said second datum voltage corresponding to the reference vectorial magnitude, converting into two rectangular voltages said first datum voltage and said second datum voltage after said filtering at the frequency of said two alternating voltages, whereby is obtained two rectangular signals corresponding to said first and second datum voltages and each having a positive front and a negative front, and gating a reference voltage by means of the positive front of said two rectangular signals, whereby the output voltage of said gate circuit is proportional to the angle of the vector with said reference vectorial magnitude.

4. The method as defined in claim 3 and which includes the further step of electrically demodulating said first datum voltage at the frequency of said first datum voltage, thereby obtaining a voltage proportional to the modulus of the vector.

5. A device for detecting a vector comprising a first two-output metering apparatus connected to the output of a given frequency generator and immersed in a field of said vector, and whereby each of said two outputs provides an alternating voltage having said given frequency and respectively an amplitude proportional to the components of said vector according to two variable perpendicular directions;

a second two-output metering apparatus immersed in a reference vectorial magnitude field and fixed with said first two-output metering apparatus, and whereby each of said two outputs provides a direct voltage having respective amplitudes proportional to the components of said reference vectorial magnitudes according to said two variable perpendicular directions;

a first $\pi/2$ phase shifter connected to one of the two outputs of said first metering apparatus, whereby one of the two alternating voltages is shifted by 90°;

a first adding circuit connected both to the other one of the two outputs of said first metering apparatus and to said first $\pi/2$ phase shifter, whereby the output signal from said first adding circuit is constituted by the sum of one of the two alternating voltages with the other one after shifting by 90°;

a second $\pi/2$ phase shifter connected to the output of said given frequency generator, whereby the output signal from said phase-shifter is shifted by 90° with respect to the input signal;

first and second chopper circuits respectively connected to one and to the other of the two outputs of said second metering apparatus and means connected between said choppers and the output of said given frequency generator and said second phase shifter, and respectively controlled by a signal coming from said generator and said phase shifter, whereby the two direct voltages from said second metering apparatus are chopped by signals shifted by 90° at said given frequency;

a second adding circuit connected to the output of said first and second chopper circuits, whereby the output signal from said second adding circuit is constituted by the sum of the outputs of said chopper circuits;

a filter tuned to the frequency of said given frequency generator and connected to the output of said second adding circuit, whereby the output signal from said filter is at said latter frequency; and a demodulator circuit connected on the one hand to the output of said first adding circuit and, on the other hand, to means connected between said demodulator circuit and the output of said filter and controlled by a signal coming therefrom, whereby the output voltage from said first adding circuit is demodulated by the output signal from the second adding circuit through said filter, and the resulting voltage is proportional to the mean direct component, with respect to the direction of the reference vectorial magnitude, of the vector to be determined.

6. A device as set forth in claim 5 wherein said means connected between said chopper circuits and the output of said given frequency generator and said second phase shifter include square wave amplifiers, whereby the signals controlling said chopper circuits are rectangular signals.

7. A device as set forth in claim 5 wherein said means connected between said demodulator circuit and the output of said filter includes a square wave amplifier, whereby the signal controlling said demodulator is a rectangular signal.

8. A device as defined in claim 5 wherein said first metering apparatus is constituted by an electromagnetic flow-meter applicable to determination of the velocity of a fluid flow.

9. A device as defined in claim 5 wherein said second metering apparatus is constituted by two magnetometers having their respective probes located in accordance with said perpendicular directions.

10. A device for detecting a vector comprising a first two-output metering apparatus connected to the output of a given frequency generator and immersed in a field of said vector, and whereby each of said two outputs provides an alternating voltage having said given frequency and respectively an amplitude proportional to the components of said vector according to two variable perpendicular directions;

a second two-output metering apparatus immersed in a reference vectorial magnitude field and fixed with said first two-output metering apparatus, and whereby each of said two outputs provides a direct voltage having respective amplitudes proportional to the components of said reference vectorial magnitudes according to said two variable perpendicular directions;

a first $\pi/2$ phase shifter connected to one of the two outputs of said first metering apparatus, whereby one of the two alternating voltages is shifted by 90°;

a first adding circuit connected both to the other one of the two outputs of said first metering apparatus and to said first $\pi/2$ phase shifter, whereby the output signal from said first adding circuit is constituted by the sum of one of the two alternating voltages with the other one after shifting by 90°;

a second $\pi/2$ phase shifter connected to the output of said given frequency generator, whereby the output signal from said phase-shifter is shifted by 90° with respect to the input signal;

first and second chopper circuits respectively connected to one and to the other of the two outputs of said second metering apparatus and means connected between said choppers and the output of said given frequency generator and said second phase shifter, and respectively controlled by a signal coming from said generator and said phase shifter, whereby the two direct voltages from said second metering apparatus are chopped by signals shifted by 90° at said given frequency;

a second adding circuit connected to the output of said first and second chopper circuits, whereby the output signal from said second adding circuit is constituted by the sum of the outputs of said chopper circuits;

a filter tuned to the frequency of said given frequency generator and connected to the output of said second adding circuit, whereby the output signal from said filter is at said latter frequency;

a third $\pi/2$ phase shifter connected to the output of said second adding circuit, whereby the output signal is shifted by 90° with respect to the input signal; and a demodulator circuit connected on one hand to the output of said first adding circuit and, on the other hand, to means connected between said demodulator and the output of said third $\pi/2$ phase shifter and controlled by the signal coming therefrom, whereby the output voltage of said first adding circuit is demodulated by a signal shifted by 90° from the output of said second adding circuit, and the resulting voltage is proportional to the mean direct component, with respect to a perpendicular direction to the reference vectorial magnitude, of the vector to be determined.

11. A device as set forth in claim 10 wherein said means connected between said choppers and the output of said given frequency generator and said second phase shifter include square wave amplifiers, whereby the signals controlling said choppers are rectangular signals.

12. A device as set forth in claim 10 wherein said means connected between said demodulator circuit and the output of said third $\pi/2$ phase shifter includes a square wave amplifier, whereby the signal controlling said demodulator is a rectangular signal.

13. A device as defined in claim 10 wherein said first metering apparatus is constituted by an electromagnetic flow-meter applicable to determination of the velocity of a fluid flow.

14. A device as defined in claim 10 wherein said second metering apparatus is constituted by two magnetometers having their respective probes located in accordance with said perpendicular directions.

15. A device for detecting a vector comprising a first two-output metering apparatus connected to the output of a given frequency generator and immersed in a field of said vector, and whereby each of said two outputs provides an alternating voltage having said given frequency and respectively an amplitude proportional to the components of said vector according to two variable perpendicular directions;

a second two-output metering apparatus immersed in a reference vectorial magnitude field and fixed with said first two-output metering apparatus, and whereby each of said two outputs provides a direct voltage having respective amplitudes proportional to the components of said reference vectorial magnitudes according to said two variable perpendicular directions;

a first $\pi/2$ phase shifter connected to one of the two outputs of said first metering apparatus, whereby one of the two alternating voltages is shifted by 90°;

a first adding circuit connected both to the other one of the two outputs of said first metering apparatus and to said first $\pi/2$ phase shifter, whereby the output signal from said first adding circuit is constituted by the sum of one of the two alternating voltages with the other one after shifting by 90°;

a second $\pi/2$ phase shifter connected to the output of said given frequency generator, whereby the output signal from said phase-shifter is shifted by 90° with respect to the input signal;

first and second chopper circuits respectively connected to one and to the other of the two outputs of said second metering apparatus and means connected between said choppers and the output of said given frequency generator and said second phase shifter, and respectively controlled by a signal coming from said generator and said phase shifter, whereby the two direct voltages from said second metering apparatus are chopped by signals shifted by 90° at said given frequency;

a second adding circuit connected to the output of said first and second chopper circuits, whereby the output signal from said second adding circuit is constituted by the sum of the outputs of said chopper circuits;

a filter tuned to the frequency of said given frequency generator and connected to the output of said second adding circuit, whereby the output signal from said filter is at said latter frequency;

a three input gate circuit, first and second means connecting the outputs of said first adding circuit and said filter respectively to two of the three gate inputs and controlled by two voltage signals coming therefrom, whereby the voltage signals coming from said first adding circuit and said second adding circuit through said filter serve to respectively close and open said gate circuit;

a reference voltage source connected to the third input of said gate circuit, whereby there is obtained at the output of said gate circuit variable duration voltage pulses proportional to the phase shifting of said outputs of said first adding circuit and said filter; and an integrating circuit having its input connected to the output of said gate circuit, whereby there is obtained at the output of said integrating circuit a direct voltage whose mean value is proportional to the angle of the vector with said reference vectorial magnitude.

16. A device as defined in claim 15 and which further includes a demodulator circuit having two inputs respectively connected to the output of said first adding circuit and to said first means connected between said first adding circuit and the input of said gate circuit, and a second integrating circuit having its input connected to the output of said demodulator circuit whereby there is obtained at the output of said second integrating circuit a direct voltage whose means value is proportional to the modulus of the vector with said reference vectorial magnitude.

17. A device as defined in claim 15 wherein said first and second means connected between said gate circuit and the respective outputs of said first adding circuit and said filter includes square wave amplifiers.

18. A device as set forth in claim 15 wherein said means connected between said chopper circuits and the output of said given frequency generator and said second phase shifter include square wave amplifiers, whereby the signals controlling said chopper circuits are rectangular signals.

19. A device as defined in claim 15 wherein said first metering apparatus is constituted by an electromagnetic flow-meter applicable to determination of the velocity of a fluid flow.

20. A device as defined in claim 15 wherein said second metering apparatus is constituted by two magnetometers having their respective probes located in accordance with said perpendicular directions.

* * * * *